Oct. 25, 1938.　　　　A. F. COLTON　　　　2,133,973

AUTOMATIC JUSTIFYING APPARATUS

Filed Sept. 30, 1935　　　6 Sheets-Sheet 1

INVENTOR
ALPHA F. COLTON
BY Parker & Burton
ATTORNEY

Oct. 25, 1938.  A. F. COLTON  2,133,973
AUTOMATIC JUSTIFYING APPARATUS
Filed Sept. 30, 1935  6 Sheets-Sheet 3

INVENTOR
ALPHA F. COLTON
BY
Parker & Burton
ATTORNEY

Oct. 25, 1938.  A. F. COLTON  2,133,973
AUTOMATIC JUSTIFYING APPARATUS
Filed Sept. 30, 1935

INVENTOR.
ALPHA F. COLTON
BY
Parker & Burton
ATTORNEY.

Oct. 25, 1938.  A. F. COLTON  2,133,973
AUTOMATIC JUSTIFYING APPARATUS
Filed Sept. 30, 1935  6 Sheets-Sheet 5

INVENTOR.
ALPHA F. COLTON
BY
Parker & Burton
ATTORNEY.

Oct. 25, 1938.   A. F. COLTON   2,133,973
AUTOMATIC JUSTIFYING APPARATUS
Filed Sept. 30, 1935   6 Sheets-Sheet 6

INVENTOR.
ALPHA F. COLTON
BY Parker & Burton
ATTORNEY.

Patented Oct. 25, 1938

2,133,973

UNITED STATES PATENT OFFICE 2,133,973

AUTOMATIC JUSTIFYING APPARATUS

Alpha F. Colton, Ashland, Ohio

Application September 30, 1935, Serial No. 42,796

31 Claims. (Cl. 197—84)

This invention relates generally to the art of printing and more particularly to an improved method and apparatus for varying the character spacing of the printed material. Reference is made to my Patent No. 2,018,547, wherein there is described and claimed certain features which may be incorporated in the invention described herein.

Attempts have been made in the past to provide mechanism for varying the spacing of characters printed by those printing apparatuses in which a recording surface is capable of step-by-step advancement as each character is printed thereon. The purpose of such character spacing was to produce an even or squared up column of printed material similar to that found in newspapers and books. The machines which were produced to accomplish this purpose required a great deal of work on the part of the operator— both mentally and physically. As a result, these machines, if they were workable at all, would require the services of a highly skilled operator. To operate such devices, a visual inspection of the printed work would have to be made, mental calculations indulged in, and dials adjusted for the printing of every line. In all cases a rough or trial sheet of the printed material was required to be first produced. Then the operator retyped this material, adjusting dials and regulating various parts before the retyping of each line in the final production to vary the length of the line so that it will terminate at the desired width. The operation in such cases would be slow, tedious, and unprofitable.

The important object of this invention is to provide a novel method and apparatus which will produce a squared-up column of printed material in an entirely automatic manner. The operator merely has to impress the recording surface with the desired characters and the machine automatically functions to space these characters the required amount in order to produce the even margin. No mental calculations are required. No physical efforts beyond that required to print characters are necessary. No visual measurements are required to be made by the operator, and no manual adjustments are required during the printing of the column. All these operations are done automatically by the method and apparatus described hereinafter.

Another object of this invention is to provide a novel method or procedure of printing which is applicable to various ways of justifying lines of material printed on apparatuses provided with either manual or automatic justification. This procedure simplifies the operation and speeds the printing. In accomplishing this phase of the invention the operator has merely to print a line of material, employ the terminating point of this line as a guide for determining the amount of line justification, and immediately reprint the same line in justified condition alongside of the first line. In automatic justifying apparatuses of the character described herein, the procedure enables the operator to print the line of characters in justified condition without any mental calculations and without fear of making errors in judgment.

The invention is not alone adapted for typing devices such as the common typewriter, but is adapted to any kind of a printing apparatus in which a certain portion thereof is operable to advance intermittently or step-by-step as each character is printed. In such apparatuses, the recording or print receiving sheet may move with respect to the apparatus or it may remain stationary while the printing portion of the apparatus moves relative thereto. Examples of such apparatuses for which the principle of this invention is applicable are typographic and photographic printing machines, letter embossing machines, machines operable upon cameo patterns, and photographic composing machines wherein pattern letters consisting of contrasting color values are progressively paraded before the lens of a camera in step-by-step manner. The principle of this invention is further applicable to long distance electric communications between printing apparatuses. In the last case the automatic setting device could be pre-set before the sending of signals over the wire and the squared-up copy produced at the receiving end could be photographed and printed in the usual way.

Various other objects and advantages of my invention will more fully appear from the following specification, appended claims, and accompanying drawings, wherein:

The apparatus described herein is merely illustrative of one embodiment of the invention. The various parts of the apparatus and their association and cooperation with one another are capable of many modifications and possible simplifications. The embodiment illustrated herein has been constructed and the parts arranged to emphasize and clearly show the important features of the invention. This has been done at a possible sacrifice of better design for commercial purposes. It will be obvious to those skilled in the art that many modifications of the inventive concept are possible. The invention is shown as associated with a typewriter, but it is to be distinctly understood that the invention is applicable to and capable of association with other types of printing apparatuses.

Essentially, the embodiment of the invention illustrated herein comprises a movable print recording sheet or surface capable of intermittent or step-by-step advancement as characters are impressed thereon. Line justifying mechanism is employed to vary the step-by-step advancement in order to produce even or squared up columns of material. This mechanism includes a novel escapement device which is mounted for bodily shiftable movement which shifts at the same time it causes intermittent movement of the recording surface. The justifying mechanism is operatively associated with an automatic selector which is automatically responsive to certain positions of the recording surface for regulating the action of the justifier. In order to regulate the apparatus as a whole for line justification, a manual control is provided for predetermining the desired column width of printed material. Thereafter, no other exertion on the part of the operator than to print or type the characters is required. To render the automatic selector operative in the printing of a line, the operator is required to press a key similar to the other keys but this operation is no different from the other keys and requires no mental calculations or mechanical adjustment. Once the column width has been determined for the printing material desired, the operator merely types in a manner very similar to the operation of a typewriter.

There are other features, both mechanical and in the procedure of operation which are described herein. One such feature is the provision for locking the automatic selector mechanism when the recording surface is travelling in one direction and for unlocking it when the surface travels in the opposite direction. Another feature is the provision compensating for a certain irregularity in line justification. This provision is automatically corrected when the desired column width is selected.

Figure 15:
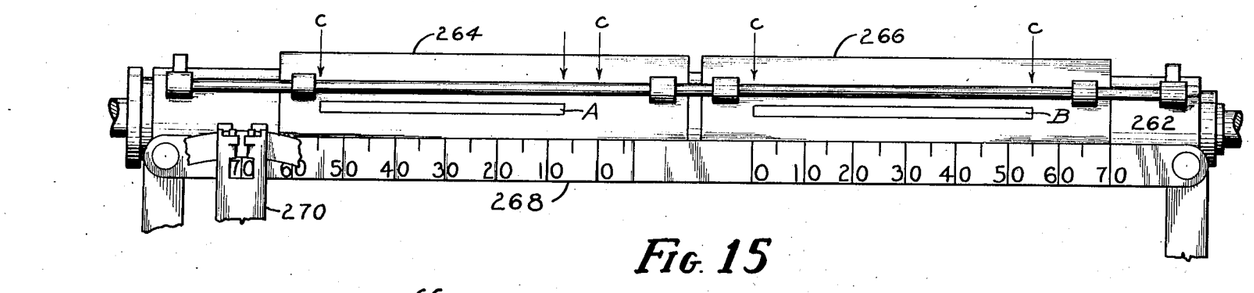
Fig. 15 is an elevation showing the recording surface and the procedure in typing the unjustified and justified lines.
Figure 18:
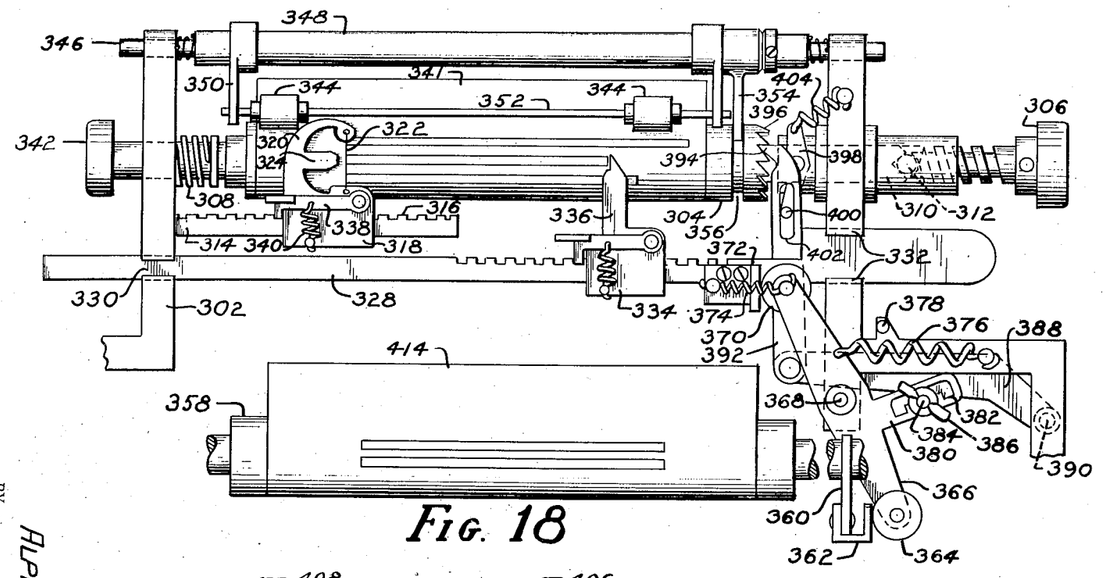
Fig. 18 is an elevation showing a modified arrangement for justifying copy.
Figure 19:
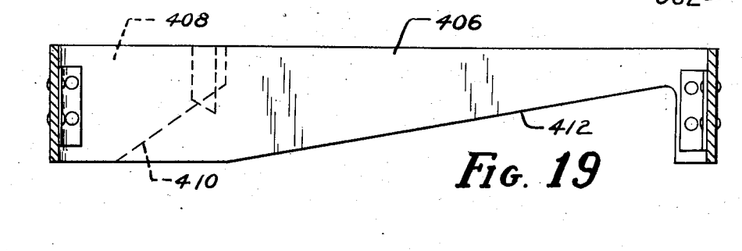
Fig. 19 is a detail view showing the carriage guides employed in the modification.

In understanding the purpose of this invention, attention is directed to Fig. 15 which shows the same line typed or printed twice, once at A in unjustified condition and again at B in justified condition. Arrows C—C, C—C represent the desired column width of 55 normal units. In operation, the operator first types line A which may be designated as a test or trial line. He then depresses a key which shifts the carriage or recording surface to present the starting position of the second line B. The operator now retypes the same line in justified condition. The same operation is repeated for each succeeding line. In Figs. 18 and 19 a modification of this procedure is shown wherein a rough or trial sheet is disposed above the sheet upon which the justified material is to be printed.

Figure 1:
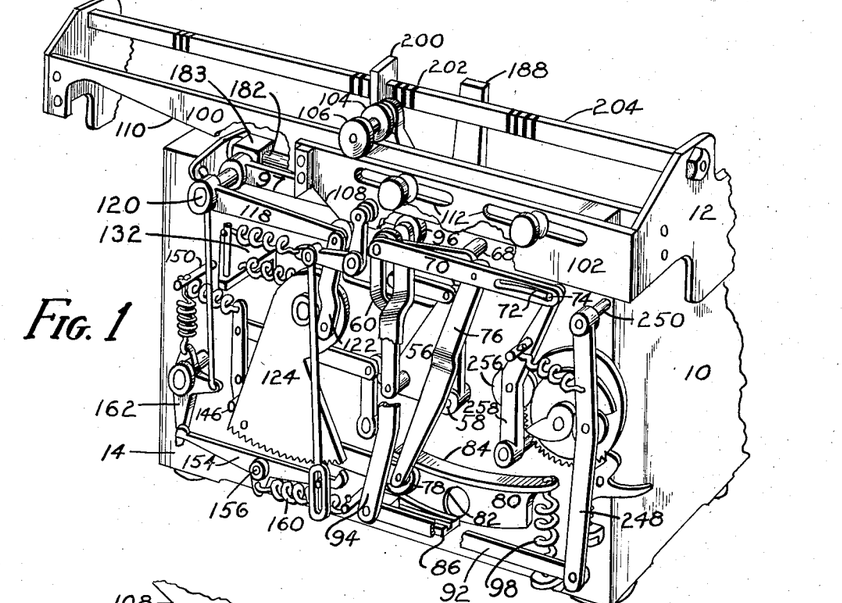
Figure 1 is a perspective view partially broken away for clearness of one embodiment of the invention showing the general assembly of the parts.

Referring to the drawings in detail, reference numeral 10 indicates the frame or housing of a printing device which for the purpose of illustration will be termed a typewriter. The typewriter carries a movable travelling carriage 12 upon which character impressions are made. The rear panel of the typewriter is indicated at 14, and mounted upon this panel as shown in Fig. 1 is an assemblage of parts which provide the automatic regulation and justification of the typed lines. This assemblage of parts could be mounted within the frame of the typewriter or within a separate casing attached to the rear of the typewriter. For the sake of clarity, the assembly of parts has been left exposed to view.

In order to justify or vary the line length of typed material produced on printing apparatuses such as typewriters the distance of movement of the carriage for each character impression is varied. There are obviously many ways of varying this distance of movement. One of such ways is that described and claimed in my Patent No. 2,018,547, wherein the mechanism causing the step-by-step advance is in turn capable of bodily movement relative to the movement of the carriage so as to lengthen or shorten the carriage travel per character typed. The mechanism for causing step-by-step advancement of the carriage herein is of the same type and is illustrated in Figs. 8 and 9.

The escapement mechanism per se is similar to that ordinarily found in typewriters. It consists of a rockably mounted plate 16 provided with a pair of laterally offset pawls 18 and 20 which are engageable with a star wheel 22. The star wheel is secured to a shaft upon which is rotatably mounted a pinion 24 engageable with the carriage rack 26. Pinion 24 rotates upon the star wheel shaft and is coupled with the star wheel in the usual manner by a one way dog which clicks past the teeth of the pinion 24 when the carriage is returned to starting position. Pawl 18 is integral with the plate 16 but pawl 20 is resiliently mounted in the usual manner by a spring 28 to allow rapid and positive escapement and stopping of the star wheel as is common in many typewriters.

Figures 8, 9:
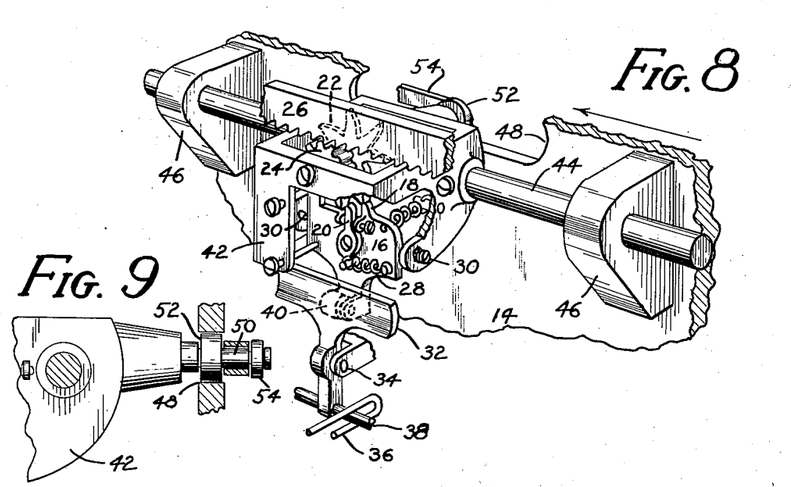
Fig. 8 is a perspective view showing the manner of mounting the escapement mechanism and controlling the operation of the same.
Fig. 9 is a cross-sectional view showing the exterior of the escapement housing and the manner of bodily shifting the same through the rear wall of the apparatus.

The carriage is spring pressed to advance in one direction as indicated by the arrow in Fig. 8. The pawls rocking back and forth between the teeth of the star wheel allow the carriage to advance one tooth at a time producing the step-by-step advancement characterized above. In the actual operation of an ordinary typewriter the typewriter carriage is advanced part of the distance between the teeth, then the printing action takes place followed by the advance of the carriage for the remainder of the distance between the teeth.

A plate 16 is pivotally suspended as indicated in Fig. 8 about two points 30, and rocking movement of the same causes the pawls to pass between the teeth of the star wheel 22. Means for producing the rocking movement of the plate 16 is shown in the form of a slightly arcuate bar or arm 32 pivotally mounted at 34. The bar is operably associated with the typing mechanism of the typewriter so as to pivot whenever a character key or space bar is depressed. Any desired form of mechanism may be employed for coupling this bar with the typing members. In Fig. 8 a hook shaped member 36 is shown which, when the typing members of the apparatus are operated engages the lateral extending arm 38 secured to the opposite end of the pivoted bar 32 and swings the latter against the base of the plate 16. To provide frictionless contact, a roller 40 has been provided on the base of the plate 16.

The plate 16 of the escapement mechanism is mounted within a housing 42 which is fixed on shaft 44. This shaft is slidably disposed in brackets 46 which are secured to the back panel 14 of the typewriter. The rear panel is provided with a slot 48 through which extends a shaft 50 forming an integral part of the housing 42. A roller 52 on shaft 50 rides in the slot permitting slidable movement of the housing but preventing the same from rotating. A link 54 is secured to the extremity of the shaft 50 and is adapted upon reciprocation to slide both the housing 42 and the shaft 44 relative to the brackets 46. This slidable movement causes the escapement mechanism to move either with or against the movement of the rack 26. Such sliding movement causes the escapement mechanism to vary the distance of the step-by-step advancement of the rack 26. When the escapement is moved against the direction of advancement of the carriage it shortens the movement of the latter. When it is moved in the same direction it increases the normal movement of the carriage. The arm or bar 32 extends a length sufficient to actuate the escapement mechanism at any position in the course of its slidable movement by virtue of the slidable movement of the housing 42.

Figure 4:
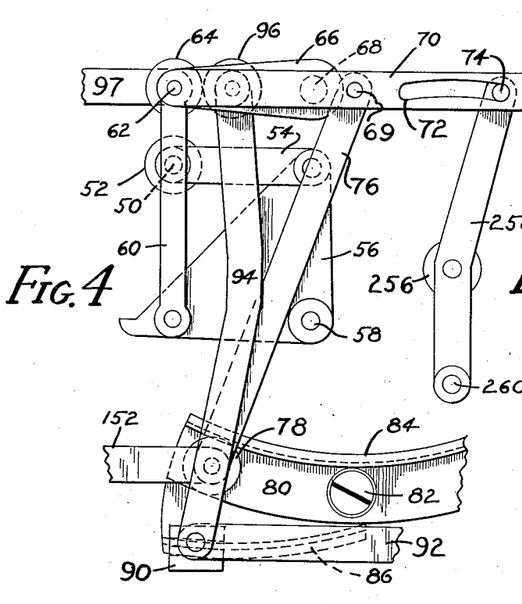
Fig. 4 is a detail view of the mechanism producing variable spacing of the characters as they are printed.
Figure 5:
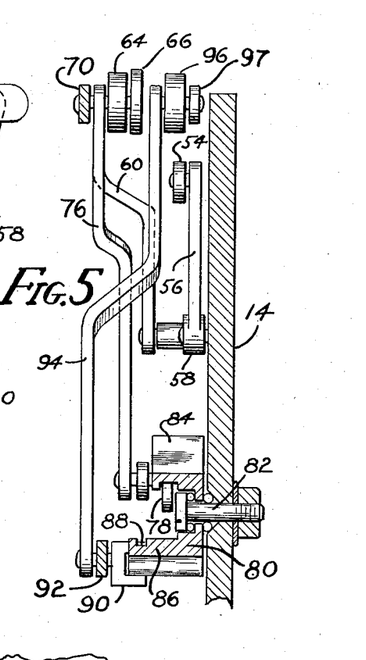
Fig. 5 is a side view of the parts shown in Fig. 4.

Mechanism will now be described for sliding the housing of the escapement mechanism relative to the carriage. The reciprocal link 54 is shown connected to one end of a bell crank 56 pivotally secured to the rear panel at 58 as shown in Figs. 1, 4, and 5. A link 60, curved as shown in Fig. 5, is secured to the other free end of the bell crank. This link is coupled at its upper extremity to a shaft 62 carrying a roller 64. A supporting link 66 journalled in the back panel 14 at 68 retains the roller and associated parts against extensive lateral movement while permitting up and down movement. As will be later described the roller 64 bears on the underside of a slide and maintains roller 78 free or slightly spaced from arcuate flange 84. Another link 70 is pivotally secured to shaft 62 upon which the roller 64 is mounted and extends horizontally to the right in Fig. 1 and is adjustably pivoted through a slot and pin relationship 72 and 74 respectively as will be more fully described hereinafter. A vertical member 76 is coupled with the link 70 intermediate its ends at 69 and carries a roller 78 on its lower extremity.

The roller 78 is associated with a rocking element 80 which is pivotally mounted at 82 to the rear panel 14. The element is provided with an arcuate flange 84 upon the underside of which the roller 78 is adapted to roll. It is readily seen that so long as the roller 78 is at any place along the arcuate flange except opposite the pivot point 82, the rocking of the element 80 will transmit motion through links and levers 76, 70, 60, bell crank 56, and link 54, to the housing for the escapement mechanism to bodily shift the same.

Mechanism for rocking element 80 in response to certain movements of the carriage will now be described. Along the bottom of the rocking member and for about one half its length is a shelf or laterally extending portion 86 in which is formed a channel 88. As clearly shown in Fig. 5, U-shaped bracket 90 is engageable in the channel to freely slide therealong. To this bracket are pivotally secured two links 92 and 94 extending at right angles to each other. The purpose of link 92 will be described hereinafter but for the present it will suffice to say that it is capable of shifting the bracket either to the right or left in the channel 88. Link 94 extends upwardly and is curved inwardly to avoid other operating parts. Its upper extremity carries a roller 96 which is disposed substantially opposite roller 64. The rocking element 80 is tensioned to rock in one direction by spring 98.

Figure 10:
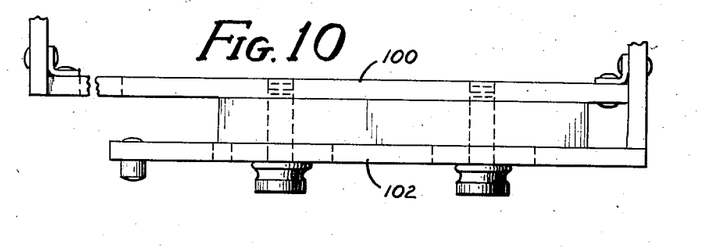
Fig. 10 is a top view showing the guides mounted on the movable carriage and the manner of securing the same to the carriage.
Figure 11:
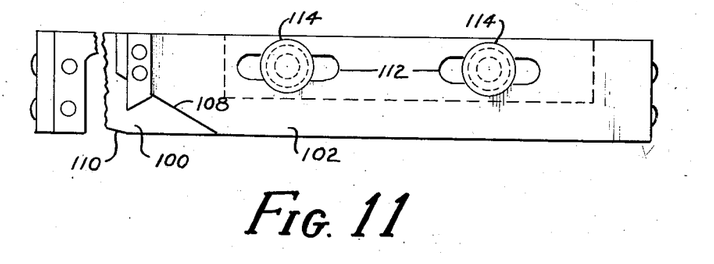
Fig. 11 is a side elevation of the guides.

The carriage 12 carries a pair of guides or slides 100 and 102 the construction of which is shown in Figs. 10 and 11. As shown in Fig. 1 these slides as well as the carriage proper are restrained against vertical movement by a pair of cooperating rollers 104 and 106 bearing down on their upper surfaces. The slides are shown in the figures as overhanging the rear wall of the typewriter. The right hand parts of each of these guides as viewed in Figs. 1 and 10 have their bottom edges extending horizontal and parallel with one another. But the left hand parts of these slides are inclined at different angles as seen in Fig. 1. Rollers are adapted to bear on the lower edges of these guides, and when the inclined portions are presented to the rollers the cooperative movement of the rollers in following these inclines affects certain of the mechanisms secured to the rear panel of the typewriter. The inclined portion 108 of slide 102 begins earlier than the inclined portion 110 of slide 100 and extends at a sharper angle as is apparent in Fig. 11. Slide 102 is provided with slots 112 through which extend fastening elements 114 which when loosened permit the slide to be adjusted relative to the other slide 100.

Roller 96 on the upper extremity of link 94 bears against the underside of slide 100. For the first part of the carriage movement, the slide is horizontal and does not affect the roller and its associated mechanism. When the inclined portion 110 is reached, the roller moves upwardly following the inclination while pivoted by arm 97 about 120. This carries link 94 and rocks the element 80 about its pivot 82 and in the direction of the spring tension. This rocking movement as previously explained pivots the bell crank 56 and slides the escapement mechanism relative to the carriage and typewriter. It is therefore seen that when the carriage approaches the latter portion of its travel it is operable to cause the escapement mechanism to shift bodily and vary its escapement operation.

Mechanism for automatically pre-selecting the amount of line variation will now be described. As pointed out in connection with Fig. 15 the trial or test line "A" generally falls short of or exceeds the desired line width. This automatic selector is operable to measure the difference between the end of the test line and the end of the desired line length and is operable to pre-set the line justifying mechanisms previously described in accordance therewith.

A certain region of the entire travel of the carriage 12 is employed for automatically pre-setting the justifying devices. This region may be some 16 to 20 consecutive normal typewriter movements at about the end of the test line A in Fig. 15. That is to say, if the test line A terminates within this region, the amount of distance it varies from the desired line length is registered upon the automatic selector and this in turn controls the subsequent operation of the space varying mechanisms. The inclined portion 108 of slide 102 determines the extent of this region. For the purposes of the embodiment illustrated herein, the slide 102 commences its inclination at ten normal typewriter units or spaces less than the desired line length and terminates six normal spaces beyond the desired length. This should be sufficient for extreme corrections, but it is obvious that the length of this pre-setting region can be increased or decreased for differently designed apparatuses.

Figures 2, 3:
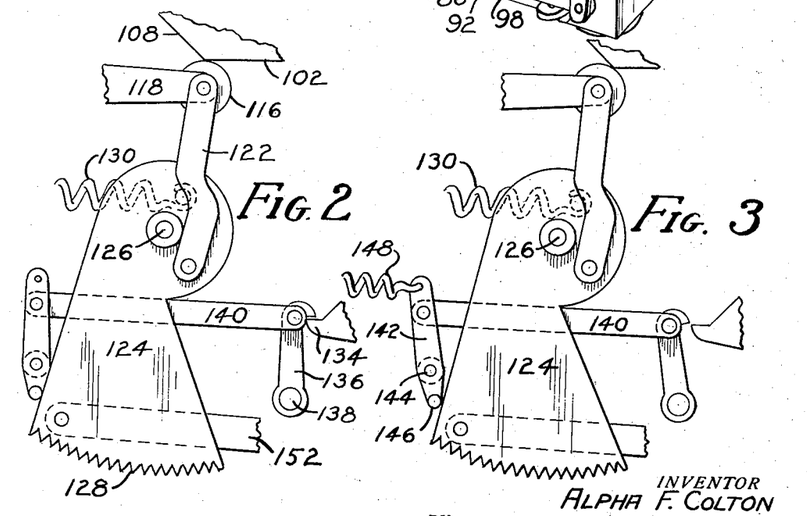
Fig. 2 is a detail view showing the normal inoperative position of the automatic selector mechanism.
Fig. 3 is a detail view showing one position of the automatic selector mechanism.

A roller 116 bears upon the undersurface of slide 102 and is restrained from lateral movement by a supporting lever 118 pivotally secured to the rear panel by shaft 120 (Figs. 1 to 3). Pivotally secured to the shaft of the roller 116 is a link 122 which extends downward and is joined to a segment or selector 124. This selector is journalled to the rear panel at 126 for swingable movement in a vertical plane. The selector is notched in arcuate formation along its bottom edge at 128, each notch being representative of a typewriter unit or space. A spring 130 joined at one end to a bracket 132 attached to the rear panel and at its other end to the selector tends to swing the latter in counterclockwise direction about its pivot point. It is obvious from Figs. 2 and 3 that when the roller 116 passes upon the inclination 108, the spring forces the selector about its pivot point and causes the roller to continually bear upon the slide and follow the inclination.

When the selector is first moved about its pivot, it trips a locking device which normally locks the bell crank 56 against movement. The bell crank is provided with a shoulder or protruding portion 134 upon which a dog 136 is adapted to overhang. In such position the dog locks the bell crank against movement. A slight clearance is provided between the dog and the shoulder to allow the dog to return to overhanging position from unlocked position shown in Fig. 3. The dog is pivoted to the back of the typewriter at 138. Multiplying leverage connects the free end of the dog with the opposite side of the selector 124. The mechanism comprises a link 140 pivotally secured at one end to the dog and at the other end to a lever 142 which is pivotally mounted adjacent its lower extremity to the rear panel at 144. The lower extremity of this lever is provided with a pin 146 which bears against the side of the selector. A spring 148 fixed to the pin 150 normally tensions the locking device to unlocked position as is apparent in Fig. 3. Comparison of Figs. 2 and 3 will show the unlocking action which occurs at the very first movement of the selector. Upon movement of the selector 124 one tooth, the dog 136 is released to unlocked position permitting the bell crank 56 to rotate clockwise.

A link 152 couples the selector 124 with the roller 78. It is obvious in Figs. 1 and 4 that rotation of the selector will cause roller 78 to travel along its arcuate path on the rocking element 80. It is therefore seen that the extent of movement transmitted by links 70 and 76 to the escapement mechanism is governed by the extent of rotation of the selector and the position the roller 78 assumes in its track. For each complete travel of the carriage, the selector would urge the roller 78 to roll the entire length of the rocking piece 80 unless the selector were restrained against movement.

Figures 13, 14:
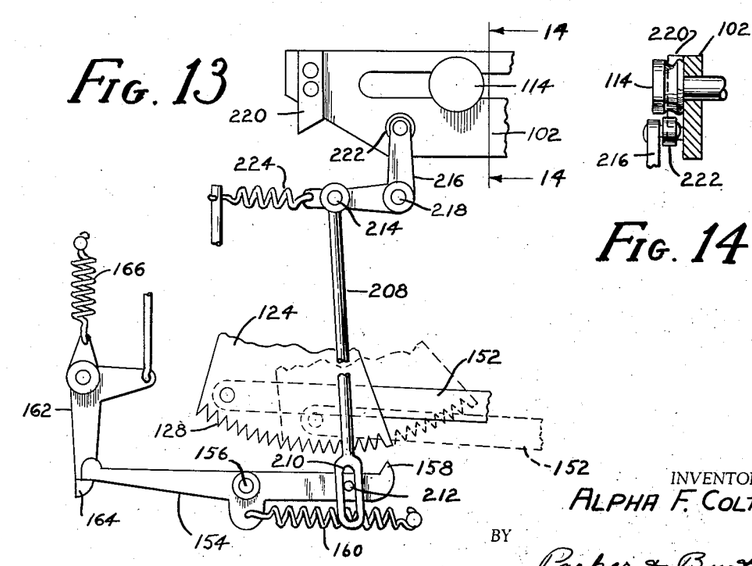
Fig. 13 is a detail view showing the operable parts for locking the pre-selector mechanism and the manner of controlling the same by the movement of the carriage.
Fig. 14 is a cross-sectional view along line 13—13 in Fig. 12.

Mechanism for locking the selector at any desired position in its course of movement comprises the assemblage in Fig. 13. This mechanism includes a rocker arm 154 journalled to the rear panel at 156 and provided at one end with an upturned wedge or tooth 158 engageable in the teeth 128 on the periphery of the selector. The rocker arm is tensioned by spring 160 to engage the selector. The rocker arm is normally restrained from engagement by a member 162 which is provided with a part 164 adapted in normal position to support the rocker arm against the tension of the spring 160. Spring 166 centers part 164 beneath the rocker arm.

Means under control of the operator is provided for removing the support 164 from beneath the rocker arm. This provision is shown in detail in Fig. 12. It comprises a tabular key 168, which may assume the usual position on the keyboard of the typewriter, coupled through intermediary linkages with the member 162. These linkages include a link 172 joining the key to an element 174 pivoted to the frame and links 176 and 178 depending from opposite ends of a rocking member 180 fixed to the shaft 182. Shaft 182 rotates in a bearing 183 fixed to the typewriter frame as shown in Fig. 1. This construction has been deleted from Fig. 12 for the sake of clarity. Link 178 is coupled to the member 162 and it is apparent that depression of the key 168 will function to pivot member 162 clockwise and release its hold on the rocking arm.

The usual function of the tabular bar key is to release the carriage for uninterrupted travel in the direction it is forced by spring tension. There is usually provided either in combination with or in place of the tabular key a device on the carriage for permitting full travel. In the present apparatus the tabular key functions to lock the toothed selector 124 in the desired position and cause full travel of the carriage. This last operation is accomplished by suitable mechanism mounted on the rotatable shaft 182.

Fixed to the shaft is an L-shaped member 184 having extensions 186 and 188. Pivotally secured to the end of the extension 186 is a slotted guide block 190. Through this block runs a rectangular bar 192 positioned on the carriage. This bar is connected at both ends (one end of which is shown in the drawings) to the rack 26 by means of vertical links 194 and levers 196. Lever 196 is pivoted to the carriage frame at 198 and its free end is joined to the rack bar 26. Raising the rectangular bar 192 will swing the lever 196 about its pivot 198 and raise the rack bar 26 out of engagement with the escapement drive pinion 24 as best shown in Fig. 8. This will permit free travel of the carriage in the direction of its tension.

Figure 12:
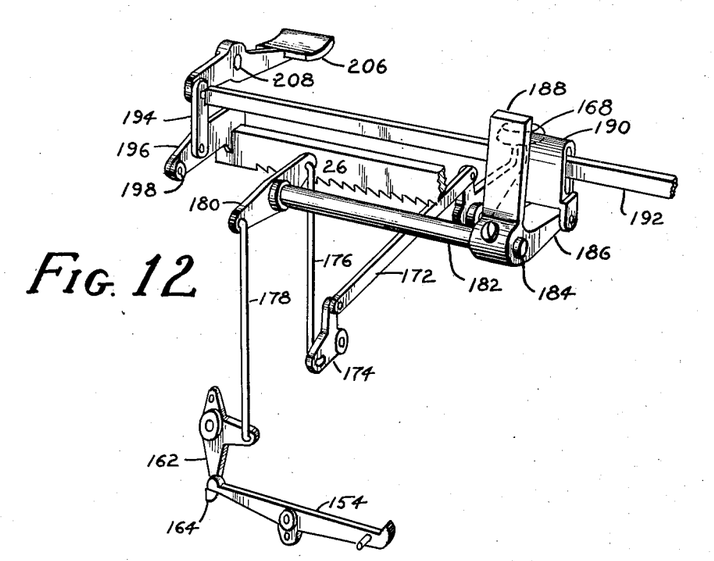
Fig. 12 is a detail perspective view showing the tabular key linkage for locking the pre-selector mechanism.

The slot in the guide block 190 is larger than the rectangular bar 192 and the normal position is that illustrated in Fig. 12 where the bar 192 is substantially in the center of the slot. This provides lost motion which permits the rocker arm 154 to be released for engagement with the selector prior to the lifting of the rack 26 by the L-shaped piece 184 which latter action will permit free travel of the carriage. That is, the selector 124 will be locked into position against movement prior to free travel of the carriage. When the carriage travels, the rectangular bar slides through the guide block 190.

The extension 188 is so arranged that when the L-shaped member 184 is rotated upon operation of the tabular key 168, it will extend into the path of the adjustable tabular stops 200 shown in Fig. 1. These stops fit into grooves 202 formed in the tabular bar 204 in the usual manner on typewriters. It is therefore apparent that when the tabular key is depressed the rocker arm 154 will be released, locking selector 124, after which the rack bar will be raised permitting free travel of the carriage until the stop 200 carried thereby strikes against the extension 188. Release of the tabular key will allow the rack bar to drop into engagement with the escapement mechanism for operation thereby and also permit extension 188 to move from the path of the stop.

Mounted on the carriage is a manually operable lever 206 which is pivoted to the carriage frame at 208. The lever is pivotally joined to the rectangular bar 192 at the connection of the link 194 therewith. Depression of the lever will likewise raise the rack bar. Since clearance is provided in the guide block 190, this operation will not disturb the tabular bar mechanism and its associated parts. This will therefore permit release of the carriage for free travel without locking or affecting the selector. The tabular stops 200 will not function to stop the carriage when the rack 26 is raised by lever 206.

Mechanism for releasing the selector 124 from the locking device 154 whenever the carriage is returned for the typing, after the typing of a line and preparatory for the typing of another line, will now be described.

This mechanism (see Fig. 13) consists of a rod 208 having a slotted extremity 210 which overlies a pin 212 on the end of the locking device 154. This rod is pivotally secured at 214 to a crank arm 216. The crank arm is journaled on shaft 218 secured to the back of the typewriter. The upper extremity of the crank arm extends into the path of a wedge-shaped member 220 secured to the slide 102. A roller 222 is provided on the crank arm. The spring 224 yieldingly centers the crank arm so that when the locking device 154 is in inoperative position or in the position shown in Fig. 13 the pin 212 is substantially in the center of the slot 210. When the carriage is moved in the direction of its tension during the typing, which is to the right in Fig. 13, the member 220 trips the crank arm ineffectively due to the lost motion between the end of the rod 210 and the pin 212. However, when the carriage is returned to its starting position which is in the opposite direction it trips the crank arm downwardly and if the locking wedge 158 of the locking device 154 is in locking engagement with the teeth of the selector 124, the pin 212 will be immediately engaged by the upper end of the slot 210 and forced downwardly carrying the wedge 188 and device 154 out of engagement.

In order to render the mechanism previously explained operable for different line lengths, a manual control is provided which adjusts the mechanism for the different line lengths which may be desired. This control is manually controlled by the operator and functions to predetermine the position of the arm 94 relative to the rocking piece 80. As explained previously, the lower part of arm or link 94 is adjustable along the shelf 86 extending from the rocking element 80.

Figure 6:
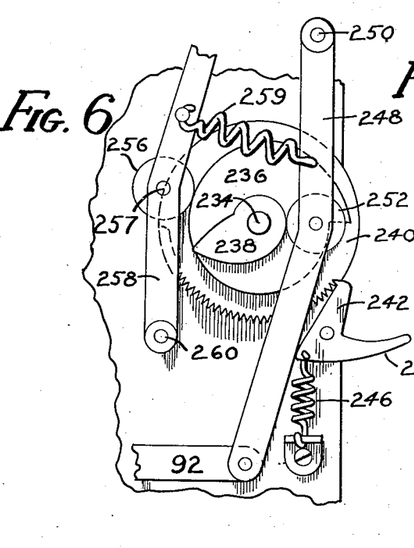
Fig. 6 is a detail view showing the adjusting device for pre-selecting the desired column width.

The manual control for adjusting link 94 in this manner consists of a dial 226 (see Fig. 7) having reference marks 228 indicating line lengths in typing units. A zero register 230 indicates to the operator the position to which he has adjusted the line varying mechanism. The dial may be mounted on the front panel 232 of the typewriter. The dial is secured to a shaft 234 extending rearwardly and carrying two cams 236 and 238 beyond the rear panel 14 as shown in Figs. 1 and 6. A disc 240 is fixed on shaft 234 and is provided with teeth into which a latch 242 is operable to engage. The latch is provided with an extension 244 which may be depressed by a finger against the tension of spring 246 to withdraw the latch from engagement and free the disc and its associated cams for movement.

An arm 248 is pivotally secured at its upper extremity to pin 250 fixed to the frame and carries a roller 252 which bears upon the cam 238. Roller 252 is spring tensioned against the cam 238 by means of spring 259. The lower extremity of this arm is pivotally coupled to link 92 which extends approximately at right angles thereto and is joined to the sliding block 90 to which arm 94 is pivotally secured (see Fig. 1). It is apparent that when the cam 238 is rotated by the dial, the arm 248 will be swung either inwardly or outwardly and shift the guide block 90 along the shelf 80. This action predetermines the position of the arm 94 relative to the rocking element 80 and in this manner varies the extent of movement transmitted from the rocking element to the shiftable escapement mechanism.

Figure 7:
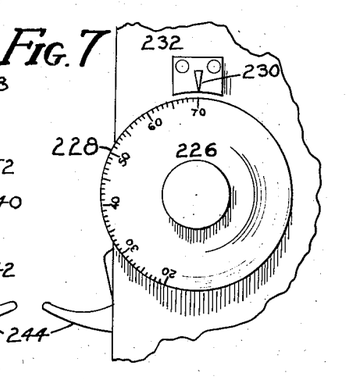
Fig. 7 is a view of a dial for the pre-selecting device shown in Fig. 6.

The position in Fig. 6 represents the extreme line length of 70 characters as indicated on the dial in Fig. 7. For shorter line lengths the roller 252 which bears upon the cam is shifted outwardly moving the lower end of arm 94 closer to the pivotal connection of the rocker 80. This enables the roller 96 and its associated link 94 to rock the rocker arm 80 the same full measure irrespective of whether the column width of printed material is long or short. The apparatus is at present set for a 70 character line length. The sliding block 90 at the base of the arm 94 is therefore located at the extreme left position as shown in Fig. 4. This means that when the roller 96 follows the long incline 110 it will rock the rocker arm through a given distance. For shorter column widths, such as for example one of 20 characters, the roller 96 does not travel very far along the incline 110. In order that it may cause the same amount of rocking movement for rocker 80, the sliding block 90 must be advanced closer to the pivot point of the rocker. In other words, the adjustable sliding connection between the arm 94 and the rocker 80 forms a leverage multiplying connection which maintains constant rocking movement of rocker 80 irrespective of whether the roller 96 travels a short distance for narrow column widths of printed material or travels a long distance for wide column widths.

A roller 256 bears upon cam 236. An arm 258 pivotally joined to the rear panel at 260 carries this roller. The roller 256 is spring tensioned against the cam 236 by the same spring 259 which stretches between arms 248 and 258. The upper extremity of this arm carries pin 74 which is slidable in the arcuate slot 72 formed in link 70. Pin 74 forms an adjustable pivotal connection for pivotally supporting link 70. When cam 236 is rotated counter clockwise as in setting for shorter line lengths, it swings the pin 74 through the slot 72 and shortens the lever action of the link 70. This adjustable pivotal connection automatically corrects a slight line discrepancy as will be more fully explained hereinafter.

Fig. 15 is a front view of the carriage. The customary platen 262 carries two sheets of paper 264 and 266 upon which typewritten lines represented at A and B have been typed. A scale 268 indicates the line lengths. Member 270 supports a ribbon upon which movable type are impressed in the customary manner.

Figure 16:
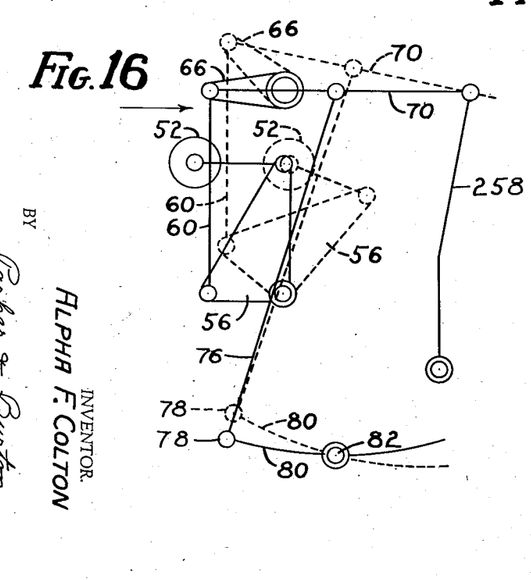
Fig. 16 is a diagrammatic view illustrating the operation of the parts for increasing the carriage movement for each character impression.
Figure 17:
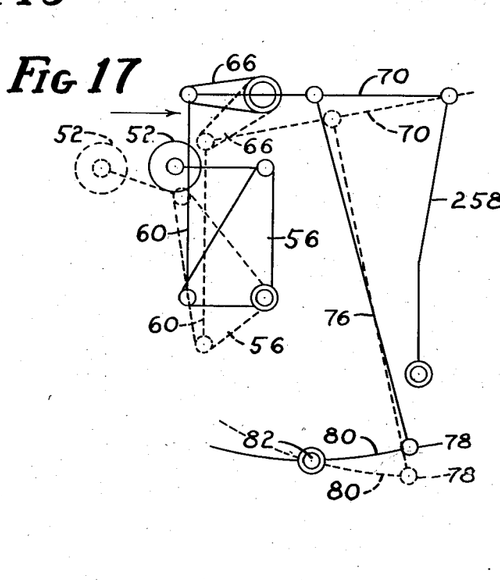
Fig. 17 is a similar diagrammatic view illustrating the operation of the parts for decreasing the carriage movement for each character impression.

Figs. 16 and 17 illustrate the mechanical movements of the variable line spacing mechanism. The parts are numbered as previously described. The full lines represent the inoperative position of the line spacing mechanism. The dotted lines Fig. 16 represent a position during the expansion of a line. The dotted lines in Fig. 17 represent a position in the compression of a line. The arrows in both figures indicate the direction of carriage travel during the typing. From Fig. 16 it is apparent that the roller 52 which slides with the escapement mechanism is moving in the direction of the carriage travel thereby lengthening each normal movement of the carriage when a character is typed. It is apparent in Fig. 17 that the escapement mechanism as represented by the roller 52 moves against the carriage travel thereby foreshortening each movement of the carriage per character typed. Whether a character space is lengthened or shortened is dependent upon whether the roller 78 is positioned on the left or right hand side of the pivot point 82 (see Figs. 1 and 4).

In the operation of this embodiment of the invention, two suitable sheets of paper 264 and 266 are placed in the customary manner around the platen 262 (Fig. 15). Instead of two sheets, a single sheet may be used which later can be severed into two parts, one containing the rough or trial typing and the other the final justified material. These sheets are adjusted on the platen to present the point where the typed lines are to begin opposite the zero indications on the scale 268. A tabular stop 200 is positioned along the tabular rack 204 opposite the second zero on the scale so that the carriage will be prepared to start the second line after it has been stopped in its advance by the tabular stop striking against the upstanding member 188.

The dial 226 is now adjusted to the column width desired. As an example, a column width of 55 normal typewriter characters is desired. The scale 228 is turned to that figure. The adjustment of this scale as previously described shifts the sliding piece 90 along flange 86 until it reaches a point where a line length of 55 characters will rock the rocker 80 its regular distance of movement. Arm 94 to which the sliding piece 90 is secured forms the intermediary through which movement is transmitted from the carriage to rock the element 80.

The operator returns the carriage to the right to start the typing of the trial line. The first line on the trial sheet is typed. At its conclusion the operator depresses the tabular key 163 which raises the rack 26 from the control of the escapement mechanism and causes the carriage to advance until the tabular stop 200 strikes against bar 188 to stop it opposite the starting point of the final line. The operator now retypes the trial line and the line length is varied in accordance with the automatic control functioning between the first and second typing operations. Once the column width has been selected on the dial, there are no other adjustments. The operator merely types the line, presses the tabular key, and types the line over again.

As the end of the trail line is approached, the inclined track 108 on the carriage slide 102 is presented to the roller 116 which through the selector 124 determines the position of the roller 78 along the rocking member 80. As previously described the inclined track extends from 10 units less than the desired line length (that is, in the present example from the 45th character) to six more than the desired line length or to the 61st character. On the left hand scale 268 in Fig. 15, this inclined section 108 extends from the 10th reference numeral to six units to the right of the zero. As the carriage presents the inclined section from the 45th to the 61st character to the roller 116, the roller and its associated arm 122 rise and swing the notched segment 124 in counterclockwise direction. This segment in turn thrusts the roller 78 along the track on the rocker 80 until the end of the trial line is reached. Depression of the tabular key at this point releases the holding device 162 and allows the locking arm 154 to pivot into mesh with the notched section 128 on the segment. This locks the segment and mechanism coupled therewith against further movement. The first portion of the action of the tabular key is to perform this locking engagement. As the key is further depressed, guide 190 removes the rack 26 from the escapement mechanism and the carriage is impelled under spring tension to advance uninterruptedly forward until the stop 200 is struck by the vertical member 188. Release of the tabular key, reengages the escapement mechanism with the rack, but the holding device 162 swings ineffectively above the end of the locking arm 154 and the segment is still retained in locked position.

After the carriage has been stopped by the tabular stop, it is now ready for the second or final typing. The tabular stop has halted the carriage at the commencement of the inclined track 110. As previously described, this track causes the roller 96 to gradually rise as the second line is typed. As the roller rises it lifts the arm 94 and causes the rocking member 80 to rock as the carriage is moved for each character typed. This rocking movement as previously pointed out shifts the escapement mechanism either with or against the movement of the carriage depending on whether link 76 is to the left or right of the pivotal point of the rocker 80. This operation is described in connection with Figs. 16 and 17. Whether the escapement mechanism is shifted with or against the carriage movement is dependent upon how far the roller 78 has advanced on the track 84 of the rocking member. This is in turn dependent upon the length of the trial line. If the trial line is less than the desired line length, viz 55 units, roller 78 will be positioned to the left of the pivot center 82 as viewed in Figs. 1 and 4. If the trial line exceeds the required amount the roller will be to the right of this pivot center.

As an example, the trial line terminates at the 48th character whereas the desired length is 55 characters. The inclined track 108 commences to function at the 45th character. The segment will then have been swung a distance representative of three characters, and the locking arm would have engaged the third notch in the notched section 124. Roller 78 would have been advanced a comparatively short distance of its total distance of travel along the rocker 80. The trial line is 7 characters short of the desired length. This requires a comparatively large expansion. As a consequence, the roller 78 is positioned at a greater distance from the pivotal center of the rocking member than for shorter line expansions. Greater movements are thereby transmitted from the rocking member 80 to the escapement mechanism to shift the latter a greater distance for each character spacing.

If the trial line should terminate exactly at the required length of 55 units, the roller 78 will be positioned opposite the pivotal center of the rocking member 80 and its rocking movement will then be rendered ineffective. It is obvious that if the trial line should overrun the desired length, the roller 78 will be positioned adjacent the other end of the rocking member. In this position the escapement mechanism is caused to shift against the advance of the carriage and thereby shorten the spacing between each character. This compresses a line which in normal spacing exceeds the required length.

When the carriage is returned to starting position to commence the next succeeding line on the trial sheet, the depending member 220 strikes the roller 222 and causes the locking arm 154 to be swung out of engagement with the notches 128. This swings the left end of arm 154 against and up above the supporting catch 164, assisted by the rounded surfaces on these parts as indicated in Figure 13, and spring 166 acts to return the catch 164 under the arm to support the same in unlocked position. The rollers 116 and 96 bearing on the inclined tracks likewise return the justifying mechanism to inoperative position.

When the dial is adjusted to the column width desired, particularly where the width is relatively short, it automatically functions to correct a slight discrepancy which has been found to arise when relatively great corrections are applied, particularly in the typing of the narrower column widths. For narrow column widths the amount of expansion or contraction forms a large percentage of the total line length. For example, the maximum expansion of 10 character units forms 50% of a desired column width of 20 characters. This awkward discrepancy in line width arises particularly in these cases. To illustrate, if the desired line length is 20 character units and the trial line reaches only to 10 units, a maximum of expansion of 10 units must be made. In other words, the space between the characters must be doubled. The doubling of this spacing will occur mainly to the right of each character so that when the last or 10th character is reached, a space will occur between it and the right hand margin of the desired column width. The line will be actually nearer 19 units than 20 units. This will detract from the appearance of a column of 20 units. For wider column widths the proportion of the correction to the line length is smaller and therefore the space to the right of the last letter is less than found in narrower column widths.

To automatically correct this slight irregularity in the typing of the column, means is provided for shifting the sliding point 74 of link 70 which link forms a connecting element in the drive from the rocker 80 to the escapement mechanism. This is accomplished by mounting sliding pivot 74 on the end of lever 258, the fixed pivot of which is 260 attached to the rear wall 14 of the machine housing. Lever 258 is equipped with a roller 256 affixed thereto by pin 257 and bearing upon cam 236 under pressure induced by tension of spring 259.

As the dial is set for the shorter line widths, cams 236 and 238 are revolved to new positions. The action of cam 238 is to relocate sliding bracket 90 as previously explained. Cam 236 serves, through its contact with roller 256, to effect a movement of pivot 74 shortening the effective portion of lever 70 between pin 74 and the mutual connecting pin 69 of link 76 and lever 70.

It is readily seen that shortening of this portion of the lever results in an increase in the vertical displacement of the opposite end for the same arc traversed by rocker 80. Shortening of the effective length of the lever occurs when shorter column widths are selected on the dial. The resulting greater throw of the lever for the same arc traveled by the rocker 80 advances the rate of movement of the escapement mechanism and places the last character on the right hand margin of the column width selected.

One of the purposes of designing 74 as a sliding pivot and causing pin 62 at the opposite end to travel in a fixed arc about pivot 68 is to offset the decrease in expansion or contraction that would occur toward the end of each line. Obviously the linear motion of the escapement mechanism would decrease as connecting points on rotating parts (as rocker 80) approach the tangent perpendicular to the line of desired motion of such parts. To counteract this effect, link 70 is so connected that, irrespective of the original position of pin 74, the distance between connecting pin 69 and sliding pivot 74 will progressively shorten as member 80 nears the end of its fixed swing. The vertical component of the rocker arm 80 decreases as it approaches the end of its swing. Because of the decrease in the lever arm between 69 and 74 and the fixed distance between 62 and 68 lever 70 swings at a greater rate nullifying the decreasing vertical motion of the link 76 as rocker 80 approaches the end of its swing. Since the distance between pins 62 and 69 is unchanged, it is clear that the vertical throw of pin 62 will be maintained approximately constant per character printed.

Figs. 18 and 19 represent a modification of the foregoing apparatus whereby it is possible to type the justified line directly from a rough draft of the copy. This arrangement eliminates the double width carriage but preserves the mechanism of actual line justification, the same as in the preceding drawings and specifications.

Frame 302 is a rigid structure so designed that it partially overhangs the movable platen and carriage of the writing machine, which is, in this case, a typewriter. The frame supports a platen 304 around which the rough copy to be justified is fed, as in ordinary typewriter practice, and so mounted that it is adjustable horizontally by virtue of hand screw 306 acting against compression of spring 308. The frame 302 is so anchored that its position with respect to the writing machine is fixed, either by separate fastening or by attachment to the body of the machine proper.

Between shaft 310 of platen 304 and hand screw 306 is a steel ball 312 which allows for lateral adjustment of platen by turning of handscrew without rotating said platen and conversely allows the platen to be rotated by mechanism to be described hereinafter without changing the setting of the hand screw.

Reference numeral 314 indicates a rigid fixed bar attached to frame 302, the upper surface of which is divided by slots or teeth 316, each one corresponding to one character space on the machine. Mounted on this bar is an adjustable rider consisting of plate 318 hollowed out to permit sliding on bar 314. Plate 318 is so cut that an overhanging arm 320 fixes the upper end of a sighting wire 322. A protruding tongue 324 indicates the line of copy being justified. The lower end of sight wire 322 is affixed to plate 318 proper as shown.

Bar 328 is also divided on its upper surface by slots or teeth corresponding to character spaces on the machine and is slidable horizontally in slots 330 and 332 of frame 302. Mounted on this bar is another plate 334, hollowed out as before to permit of sliding, and equipped with a pointer 336 of such length that it serves to indicate positions on the line being justified, in turn shown by tongue 324.

Left hand rider or indicator 318 is set by means of latch 338 which engages with the divisions on bar 314. This latch is held in contact with bar 314 by tension of spring 340. A similar provision is made for setting the right hand indicator 334.

Sheet 341 represents the rough draft on which the copy to be justified is printed or typed, each line ending within the limits of expansion or compression of the machine. That is, were the justified line to be 55 units in length, the rough draft would be composed of lines varying between 45 and 61 character spaces, or from 10 less than the desired number to 6 more.

The copy is rolled on the platen 304 by hand rotation of knob 342 affixed to projecting end of axis of roller. By means of hand screw 306 acting through ball 312 upon shaft 310, the platen may be bodily shifted to the right or left as required to make the left hand margin of the copy coincide with the sight wire 322. Pressure rollers 344 hold the sheet in position. These rollers are suspended from shaft 346 through the intermediary of sleeve 348, vertical arms 350 and cross piece 352. Sleeve 348 is fixed on shaft 346 which in turn is slidably mounted in vertical arms of the frame 302. By means of light torsion springs acting between frame 302 and sleeve 348 the rollers may be made to bear on the platen with a moderate pressure.

The platen on which the justified line appears is represented by 358. The platen is mounted upon a carriage in the customary manner, one side wall of which appears at 360. To this wall is attached a bracket 362 extending rearwardly and projecting into the clear, beyond the plane of the back of the carriage. This bracket contacts roller 364 in the earlier stages of carriage travel—that is, after the carriage is returned for typing of another line and during the first score of characters of the new line. The effect of contact with this roller is twofold—it causes an opposite displacement of bar 328 equal in amount to the number of character spaces during which there was contact, and automatically resets platen 304 for the next line to be justified.

The former operation is effected through the rotating of lever 366, on which roller 364 is mounted, around the fixed pivot 368, thereby moving roller 370 affixed to the upper end an equal distance in the opposite direction. Since roller 370 bears on angle bracket 372 attached to bar 328 and is held in contact thereby by spring 374 it follows that bar 328 will be subject to equal and opposite motion to that experienced by roller 364. Rollers 364 and 370 are free to rotate allowing for small vertical displacements, at the same time maintaining contact with brackets 362 and 372 respectively. The tension of spring 376 between lever 366 and frame 302 tends to return the lever to an upright position where it is restrained from further motion by stud 378 attached to the frame.

The secondary operation of automatically resetting platen 304 for a new line of rough copy is accomplished as follows. Projecting from lever 366 is an arm 380 having a slot 382 on the lower face of which are cut a number of teeth, in this case three. A pin 384 is adaptable to selective location in any of the troughs between the teeth, and a wing nut 386 serves to hold the pin by pressure upon arm 380. Lever 388 is pivoted to frame 302 at 390 and is pivotally connected at its opposite end to member 392. The upper end of member 392 is provided with a prong 394 which is adapted to engage teeth in gear 396 on platen 304 as shown. Prong 394 is held in mesh by a lever 398 so arranged that a pin 400 at its lower end slides in a slot 402 formed in member 392. The tension of a light spring 404 is sufficient to hold the spring 394 in contact during upward motion, but the weight of the lever 388 and member 392 causes slippage downward when the upward pressure is removed. Because of this weight lever 388 is always in contact with the pin 384.

By varying the position of this pin 384, lever 388 can be given a motion so as to effect a rotation of platen 304 equivalent to either a single, double, or triple, line spacing. That is, when the pin 384 is in the extreme left hand trough, a short vertical movement of lever 388 is caused upon the return of the carriage. This movement is small because of the reduced vertical component of the movement of pin 384 (shorter radius) and the long lever arm between the average point of contact with lever 388 and the pivot point 390 of this lever. Consequently the rotation of platen 304 is equivalent to only a single line space.

When the pin 384 is in the right hand position, the increase in its vertical movement together with the shortening of the effective lever arm of lever 388 causes a greater vertical displacement of member 392 and a triple space rotation of platen 304 results. The intermediate trough obviously effects a double vertical spacing.

The operation of the entire assemblage is as follows. The operator shifts the platen 358 as far to the right as possible. This shifts bar 328 to the limit of its leftward motion. The rough copy is then fed into platen 304 as previously described, lining up the left hand margin with sight wire 322 and the first line to be justified with tongue 324 by means of hand screw 306 and knob 342 respectively. The operator then adjusts indicator 334 such that the pointer designates a position 10 characters less than the desired amount as measured from the sight wire 322, in this example 45 characters where the desired column width is 55 characters.

Fig. 19 is the representation of the modified form of the slides 100 and 102 previously described. These slides are represented at 406 and 408, the former corresponding to 100 and the latter to 102. Slides 406 and 408 are shorter, however, because of the elimination of the long double length platen by superimposing the trial sheet above the justified sheet. With the carriage in its extreme right hand position, a roller corresponding to roller 116 previously described and which similarly controls the preselecting mechanism is just at the beginning of slope 410 on slide 408.

With the pointer 336 at the 45th character the operator then, by judicious use of the typewriter spacer bar, allows carriage to move in its normal leftward direction until it reaches such a position where the pointer 336 indicates the end of the unjustified line on sheet 341. The roller functioning similarly to roller 116 has in the meantime progressed up incline 410 and preset the mechanism of justification exactly as herebefore described. On pressing the tabular key, the carriage jumps to the position for typing the justified line, positioning a roller corresponding in function to roller 96 just at the beginning of the longer incline 412 on slide 406. On retyping the line on the final draft sheet 414 around the platen 358, justification proceeds in an identical manner as before illustrated and the line is extended or compressed to the desired 55 units.

On return of the carriage, platen 304 is rotated to the next lower line on the copy by prong 394 as previously described, and pointer 336 is again automatically shifted to the position 10 units less than the required line length. From here the operation is repeated.

Instead of employing guide-ways or inclines 108 and 110 on the carriage, a rotatable cam corresponding to incline 108 and a rotatable cam corresponding to incline 110 can be used. In this modification, suitable mechanism, such as a ratchet and pinion, would drive these cams. Bearing on these cams would be rollers corresponding to rollers 96 and 116. These rollers would operate their respective links or arms 94 and 122 as previously described.

Various modifications of the structure illustrated will be apparent to those skilled in the art and for that reason I intend to limit myself only within the scope of the appended claims.

What I claim is:

1. In a printing apparatus, a print recording surface, means for advancing said surface in step by step manner as character impressions are made thereon, means controlling said first means for varying the extent of movement of said surface for each step by step advancement, and means responsive to certain positions of said surface in its advance for controlling said second mentioned means.

2. In a printing apparatus, a print receiving surface operable to bodily shift a certain prescribed distance for each character impression made thereon, a line justifying mechanism adapted to vary the distance through which said surface moves for each character impression, and means responsive to the position assumed by said surface within its range of movement and operable to control said justifying mechanism in accordance with the position of the surface.

3. The combination with a printing apparatus having a movable impression receiving surface operable to advance intermittently as characters are impressed thereon; means for varying the distance of advance of said surface for each character impression including a selector mechanism responsive to certain positions of said surface in its movement for predetermining the advance of said surface for each character impression, and mechanism controlled by said selector mechanism operable upon movement of said surface to cause the same to vary its advance for each character impression in accordance with the control exercised thereover by said selector mechanism.

4. In printing apparatus, a part operable to travel in step by step manner as each character impression is made, means for varying the step by step travel for each character impression, means automatically operable to control said first means in accordance with the position of said travelling part, and means under manual control for rendering said second means operative to control said first means.

5. In a printing apparatus, a part adapted to advance in a uniform series of steps, means responsive to certain positions of said part within a prescribed range of its total distance of advancement for automatically preselecting the length of uniform advancement of travel, means under control of said first means for causing uniform but variable advancement of said part in accordance with the control exercised thereover by the first means, and means under manual control for rendering said second means operative.

6. In a printing device, a movable print recording part, mechanism for causing step by step advancement of said part, means operably coupled with said part and with said mechanism and operable upon movement of the part to control the operation of the mechanism, means responsive to certain positions of said part for automatically adjusting said first means, and means manually operable for rendering said last means operable.

7. In a printing device, a movable carriage, mechanism for causing said carriage to move intermittently, said mechanism being mounted to shift bodily relative to said carriage so as to vary the extent of its intermittent movement caused by the mechanism, means for bodily shifting said mechanism as the latter causes the carriage to move, and means responsive to certain positions of said carriage for adjusting said first means.

8. In a printing apparatus, a part operable to travel in a series of successive advancements, means under control of the operator for predetermining a desired line length of printed material, means for varying said advancements to produce the desired line length of printed material, a guideway on said part, and means engaging said guideway and responsive to its position thereon for determining the extent of said advancements necessary to print a line conforming with the desired line length selected by the operator, said last means automatically operable to set said first means in accordance with the position of the former on said guideway.

9. A typewriter device comprising, in combination, a carriage adapted to carry a print recording surface, an escapement mechanism operable to shift said carriage a predetermined amount as each character is typed on said recording surface, means mounting said escapement mechanism for bodily shiftable movement, a rocker member pivotally mounted about a point intermediate its ends, means for rocking said rocker member, mechanism coupling said rocker member with said escapement mechanism including a part shiftable along said rocker member on either side of its pivotal mounting, said mechanism operable to bodily shift said escapement mechanism a variable amount in either one direction or the other in accordance with the position of said part upon said rocker member, and means responsive to certain movements of said carriage for shifting said part along said rocker member to control the amount and direction of movement transmitted to the escapement mechanism.

10. An automatic justifying typewriter device comprising, in combination, a carriage adapted to carry a print recording surface, an escapement mechanism operable to shift said carriage a predetermined amount as each character is typed on said recording surface, means mounting said escapement mechanism for bodily shiftable movement, a rocker member pivotally mounted about a point intermediate its ends and provided with a guide-way, means responsive to the movement of said carriage for rocking said rocking member, mechanism coupling said rocker member with said escapement mechanism including an element slidable along said guide-way, said mechanism responsive to the rocking movement of said rocker member to bodily shift said escapement mechanism a variable amount in one or the other direction in accordance with the position of said part in said guide-way, a selector mechanism operable to predetermine the position of said part in said guide-way, means responsive to certain positions of said carriage for actuating said selector mechanism, means under manual control for locking said selector mechanism against further actuation, and means under manual control for adjusting said means for rocking said rocker member so as to impart constant rocking movement thereto irrespective of the length of the typewritten line printed on the recording surface.

11. A line justifying typewriter device comprising, in combination, a movable carriage having a print recording surface, means for causing step by step advancement of said carriage as characters are typed on said recording surface; justifying mechanism automatically responsive to the movement of said carriage for varying the step by step advancement of the carriage, control means for adjusting said justifying mechanism to vary the step by step advancement of the carriage whereby a typewritten line may be expanded or contracted to a desired line length, means distinct from said control means operable to impose a greater variation in the step by step advancement of the carriage as shorter line lengths are selected to be typed, said last means operatively coupled with said control means so as to be automatically regulated thereby when the same adjusts said justifying mechanism.

12. In combination with a typewriter apparatus having a movable carriage for moving a print recording surface as characters are typed thereon and justifying mechanism for varying the movement of the carriage, a device for supporting a printed sheet provided with a pointer operatively coupled with said carriage and responsive to the movement thereof to travel across the printed sheet in a direction opposite to the movement of the carriage.

13. A typewriter apparatus comprising, in combination, a carriage adapted to carry a print recording sheet, means for advancing said carriage in step by step manner as each character is typed in said recording surface, justifying mechanism for varying the step by step movement whereby lines of varying lengths may be typed, a rotatable support on said typewriter apparatus for holding a printed sheet, a pointer adapted to indicate a printed line on said sheet and slidably mounted for movement longitudinally of the sheet, means operatively coupling said pointer with said movable carriage and responsive to the movement of the carriage to shift said pointer longitudinally along said line in a direction opposite to the movement of the carriage, and means responsive to the return movement of said carriage to rotate said support and present a different printed line on said sheet to the pointer.

14. In a printing apparatus, a print receiving part operable to advance intermittently as successive characters are imprinted thereon, a line justifying mechanism for varying the line lengths of the characters imprinted on said part, and means responsive to predetermined positions of said part in its advancement for controlling said justifying mechanism and causing the justifying mechanism to vary the line lengths of the characters in accordance therewith.

15. In a printing apparatus, a print receiving part movable along a given path as successive characters are imprinted thereon, a line justifying apparatus adapted to control the movement of said part so as to vary the line length of any given set of characters printed thereon, and means responsive to the position of said part within a certain range of its total path of movement for setting said justifying mechanism, said means setting said justifying mechanism for controlling the movements of said part after the part has passed said range in its path of movement.

16. In a printing apparatus, a print receiving part adapted to advance in a series of steps along a given path of movement as character impressions are made thereon, means for positioning said part at a certain place along said path of movement for starting a line of characters, justifying mechanism for controlling the movement of said part during the printing of said line of characters in order to vary the line length thereof, and means responsive to certain positions of said part in its path of movement prior to said starting place for regulating said justifying mechanism.

17. In a printing apparatus, a part adapted to advance along a given path of movement, means positioning said part intermediate the extremes of its path of movement for starting the printing of a line of characters, means controlling the movement of said part during the printing of said line of characters, and means responsive to certain positions of said part within a prescribed range of movement in advance of said starting position for regulating said last mentioned control means in accordance with the position of the part in this range of movement.

18. In a printing apparatus, a print receiving part movable in one direction along a given path of movement for the printing of a line of characters thereon and returnable along said path to starting position for the commencement of a second line of characters, means controlling the advance of said part as characters are printed thereon in order to vary the line length of the characters printed, means responsive to certain positions of said part in its path of movement for automatically adjusting said first mentioned means, and means responsive to return movement of said part for automatically resetting said first and second mentioned means for printing the second line of characters.

19. A printing apparatus comprising, in combination, a part supported for movement along a given path, means for advancing said part in a series of steps as characters are printed, means for rendering said first means inoperative and permitting said part to advance uninterruptedly, means for stopping uninterrupted advance of said part at a position intermediate the extremes of its path of movement, a justifying mechanism for varying the line lengths printed by said apparatus, and means responsive to the position of said part within a range of movement prior to said stopping position and adapted to vary the operation of said justifying mechanism in accordance with the position of said part in said range of movement.

20. Line justifying mechanism for a printing apparatus having a part operable to advance in a series of steps comprising, in combination, a member movable in response to the advancement of said part, means adjustably connecting said member to said part and arranged to control the step by step advancement of said part in accordance with said adjustment, and means operatively coupled with said part and said adjustable means and responsive to certain positions of said part to adjust the connection of said means to said part to thereby vary the advance of said part in accordance with certain positions of said part in its advancement.

21. A printing apparatus comprising, in combination, a part operable to advance in step by step manner along a given path of movement as printing impressions are made, justifying mechanism for varying the step by step advance of said part, means for regulating the operation of said justifying mechanism, said means operatively associated with said part and responsive to the advance of said part to gradually vary the regulation of said justifying mechanism in accordance with the extent of advancement of said part, and means for releasing said part for uninterrupted advance along said path of movement, said means also adapted to render said control means unresponsive to the advance of said part.

22. In a printing apparatus having a part operable to advance in step by step manner as printing operations are performed, justifying mechanism for varying the character of said step by step advancement, means operatively associated with said part and responsive to the movement thereof in one direction for gradually altering the control exercised by said justifying mechanism over said part in accordance with the extent of advancement of said part, and means under manual control for causing uninterrupted advance of said part, said means also adapted at the same time to lock said justifying mechanism in the position to which it has been adjusted by said first mentioned means.

23. In a printing apparatus, a carriage mounted for movement along a given path, escapement mechanism for imparting step by step movement to said carriage along said path of movement, means for altering said step by step movement imparted to said carriage, a manually depressible control member operable upon depression to release said carriage from the control of said escapement mechanism for uninterrupted travel along said path of movement, and mechanism operatively associated with said member and adapted upon depression of the member to allow said means to alter the step by step movement of the carriage.

24. A printing apparatus comprising, in combination, a carriage mounted for movement along a given path, mechanism for imparting step by step advance to said carriage along said path of movement, means for varying the step by step character of advance of said carriage, and means operatively associated with said carriage and with said first means and adapted in response to certain advancements of the carriage to progressively alter the control of said first means over the step by step character of the carriage advance.

25. In a printing apparatus, a carriage mounted for movement along a given path, escapement mechanism for imparting step by step advancement to said carriage along said path of movement, means for varying the step by step character of movement imparted to said carriage, means operatively associated with said carriage and with said first means and responsive to the advancement of the former along said path of movement to progressively alter the control of the latter over the step by step advance of the carriage, and a manually operable control member adapted upon initial movement to restrain further alteration of the control of said first means by said second means and upon further movement to release the carriage from the escapement mechanism for unimpeded movement free of the escapement mechanism.

26. A printing apparatus comprising, in combination, a movable carriage, means for shifting said carriage in step by step manner as printing operations are performed, a rotatable copy holder supported upon the apparatus, a pointer mounted for movement across said copy holder on a level with any printed material carried thereon, means for rotating said copy holder to present different lines of printed material to said pointer, and means operatively coupling said pointer and said copy holder rotating means with said carriage and responsive to certain movements of the carriage to cause said pointer to move across said copy holder and to rotate said copy holder.

27. In printing, a part mounted for movement along a given path as character printing operations are performed, means urging said part in one direction along its path of movement, means imposing a step-by-step advance upon said part as each character printing operation is performed, mechanism for varying the step-by-step advance of said part to vary the line length of a given set of characters, said means including a member movable about a pivot point, an operating connection between said member and said part adapted to swing the former about its pivot point as the latter moves in the direction it is urged, means adjustably connected to said member for movement therealong toward and away from said pivot point, said last means utilizing the swinging motion of said member to vary the length of each step-by-step movement of said part, and control means for adjusting the connection of said last mentioned means along said pivoted member to vary the control exercised thereby over the step-by-step advancement of said part.

28. In printing, a part mounted for movement along a given path as characters are printed successively, means urging said part in one direction along its path of movement, an escapement device for imposing a step-by-step advancement to said part as each character is printed, mechanism for varying the step-by-step advance of said part to vary the line length of a given set of characters, said mechanism including means mounting said escapement device for bodily shiftable movement, a member movable about a pivot point, an operating connection between said member and said part adapted to swing the former about said pivot point as the latter moves in the direction it is urged, and means adjustably connected to said member for movement varying distances therealong toward said pivot point and transmitting the swinging motion of said member to said escapement device to bodily shift the same as it imposes step-by-step advancement to said part.

29. In printing, a part mounted for movement along a given path of movement as characters are printed successively, means urging said part in one direction of its movement, means imposing a step-by-step advance to said part in the direction in which it is urged as each character is printed, mechanism for varying the step-by-step advance of said part to vary the line length of a given set of characters, said mechanism including a movable member having a toothed section thereon, an operating connection between said member and said part adapted to move the former progressively as the latter advances in the direction it is urged, means movable into engagement with the toothed section of said member to lock the same in adjusted position, and control means for causing movement of said last means into locking engagement with said member and for freeing said part from said step-by-step control means for uninterrupted advance in the direction it is urged.

30. In printing, a part mounted for movement along a given path, means for imposing a step-by-step advancement upon said part as character printing operations are performed, a line justifying device for varying the line lengths of given sets of characters, means responsive to a predetermined series of positions of said part in its advancement for progressively varying the operation of said justifying device and causing it to vary line lengths of characters in accordance therewith, and means for setting said justifying device in adjusted position at any point in the progressive variation of its operation.

31. In printing, a line justifying mechanism for varying the line lengths of a given set of characters, a part operable to advance in step-by-step manner as successive character printing operations are performed, means responsive to the advancement of said part within a certain range of its total length of movement to proportionately adjust the regulation of said justifying device, and means for presetting said justifying device in adjusted position when said part is in said range of movement.

ALPHA F. COLTON.